United States Patent [19]

Saliba

[11] Patent Number: 5,414,585
[45] Date of Patent: May 9, 1995

[54] ROTATING TAPE EDGE GUIDE

[75] Inventor: George Saliba, Northboro, Mass.

[73] Assignee: Quantum Corp., Milpitas, Calif.

[21] Appl. No.: 94,272

[22] Filed: Jul. 19, 1993

[51] Int. Cl.⁶ ............................................. G11B 15/60
[52] U.S. Cl. .................................................. 360/130.21
[58] Field of Search .................................. 360/130.21;
226/196–199; 242/195

[56] References Cited

U.S. PATENT DOCUMENTS

| | | | |
|---|---|---|---|
| 3,229,045 | 1/1966 | Bakos et al. | 360/130.21 |
| 3,235,195 | 2/1966 | Hebb et al. | |
| 3,695,553 | 10/1972 | Everett . | |
| 3,756,610 | 9/1973 | Naegele et al. | 360/130.21 |
| 4,975,792 | 12/1990 | Renders et al. . | |
| 5,173,828 | 12/1992 | Tanzer et al. . | |

OTHER PUBLICATIONS

P. Gilovich and J. N. Olson, "Thread/Load Arrangement for Capstan/Vacuum Column Tape Drive", IBM Technical Disclosure Bulletin, vol. 20, No. 2, Jul. 1977, pp. 764–765.

Primary Examiner—A. J. Heinz
Attorney, Agent, or Firm—David B. Harrison

[57] ABSTRACT

A method and apparatus for constraining lateral motion of a tape streaming across the transducing face of a magnetic head including two spaced apart reference mechanisms and an adjustment mechanism located in between the two reference mechanisms. Each of the reference mechanisms has a surface for engagement with a first longitudinal tape edge where both surfaces are plannarly aligned with a predetermined tape travel path and mounted for movement with the first tape edge to guide the first tape edge along the tape travel path. The adjust mechanism has a surface for engagement with the second longitudinal tape edge. The plane of the adjustment surface is parallel to the plane of the reference surfaces and mounted for movement with the second tape edge. Additionally, the adjustment surface is mounted in such a way and in a position effective to urge the first tape edge into contact with the reference surfaces to minimize movement of the tape in a direction perpendicular to the reference surfaces and the adjustment surface during tape advancement.

19 Claims, 5 Drawing Sheets

ROTATING TAPE EDGE GUIDE

BACKGROUND OF THE INVENTION

The present invention relates generally to magnetic recording tape guide assemblies, and more particularly, to a compact tape guide assembly which provides minimized lateral tape motion without tape damage.

Magnetic media are used for storage of data generated by computers. Typically a magnetic medium is presented to a magnetic head which ordinarily can either read or write data on the medium. Magnetic storage disks, commonly referred to as hard disks, are presently the preferred storage medium for use in computer systems where fast access time and substantial storage capacity are of interest. However, because of their low cost, portability, compactness and storage capacity, magnetic tapes are also used for data storage.

One advantage which tapes have over hard disks is that once the data is on a magnetic tape, the tape and its container (commonly referred to as a cartridge) can be removed from the computer and stored in a secure location or can be used for carrying or mailing data to a remote location. This removable feature allows tape and tape drives to be used as archival storage and/or "back-up" systems for hard disks. However, the data error rate must be quite low to allow use as archival and/or backup storage devices.

In order to increase storage density for a given cartridge size, thinner tape may be employed. One popular tape drive assembly, known generally as a five and one quarter inch (i.e., $5\frac{1}{4}''$) tape drive, is typically five and three quarters inch wide by three and one quarter inches high by nine inches deep (i.e., $5\frac{3}{4}'' \times 3\frac{1}{4}'' \times 9''$). This drive typically receives a five and one quarter inch cartridge which is about four and one tenth inches square and one inch high. Typically, six hundred feet of one half inch wide, one millinch thick (i.e., 1 mil) tape is wound onto a three and six tenth inch diameter supply reel in a five and one quarter inch cartridge for data storage use in a five and one quarter inch tape drive. The storage capacity of a five and one quarter inch cartridge, however, can be increased by lengthening the tape. For example, approximately one thousand, one hundred feet of one half millinch thick tape may be loaded onto the same supply reel. Therefore, more data may be stored in a five and one quarter inch cartridge using one half millinch thick tape versus one millinch thick tape.

Another way to increase the storage density for a given cartridge size is to write the bits on the tape in smaller areas and on a plurality of parallel longitudinal tracks. As more tracks are recorded on a tape, each track then becomes narrower and the tape must now be constrained from shifting up or down (called lateral tape motion) in a direction perpendicular to the tape travel path as the tape passes by the magnetic head in order to maintain proper alignment of the head and tracks on the tape. Constraining the tape to minimize lateral tape motion prevents data retrieval errors.

Lateral tape motion is defined as the peak-to-peak distance of the undesirable movement (in-plane) of the tape perpendicular to its prescribed longitudinal direction of motion past the head. Lateral tape motion is a major limiting factor in determining the minimum width of a track and the minimum spacing between tracks on the tape. Thus, as lateral tape motion is reduced, more tracks may be stored on the tape and the tape density increases accordingly.

One concern with reducing lateral tape motion is the possible damage to the tape due to wear from the tape drive assembly. As tape thickness is reduced in order to store more data in a particular sized cartridge, the strength of the tape is similarly reduced. Thus, the possibility of damage to the tape due to wear increases.

A prior art tape guide assembly is described in U.S. Pat. No. 5,173,828, entitled "Compact Multiple Roller Tape Guide Assembly", by Andrew E. Tanzer, et. al., and is assigned to the same assignee as the present invention. The tape guide assembly described in U.S. Pat. No. 5,173,828 includes six tape rollers R1–R6. FIG. 1 shows the arrangement of three of the six rollers, R1–R3, in a cross sectional view of the tape guide assembly of U.S. Pat. No. 5,173,828.

Essentially, each tape guide roller is a machined cylinder. Each roller includes a stem 20, a tape support surface 22, and flanges 24, 26. The tape support surface 22 is uniformly flat, extending parallel to the roller shaft axis 28, and preferably lies on the circumference of a six tenths millinch diameter D. The roller is mounted on a preloaded ball bearing (not shown) to prevent roller movement lateral to the tape. A small coil spring 30 and washer 32 are used to preload the roller and bearing assembly.

In the roller guide assembly of U.S. Pat. No. 5,173,828, the rollers rotate with the tape in the direction of tape travel as the tape advances. The flanges 24, 26 have surfaces 24a, 26a which may contact and provide guidance for the longitudinal edges of the tape as the tape advances along the tape travel path. When a tape edge comes in contact with a flange surface 24a or 26a, there is very little friction between the tape edge and the flange surface, because the flange is fixed to the roller so that the flanges 24, 26 and flange surfaces 24a, 26a rotate with the tape as it advances.

The distance between the flange surfaces 24a, 26a is greater than the width of the tape. Thus, the flange surfaces 24a, 26a are not in constant contact with the longitudinal tape edges. This permits a window of lateral tape movement equal to the distance between the flange surfaces 24a, 26a minus the tape width. The width of the window directly affects the thickness of the track width, the spacing between tracks and the distance from each longitudinal tape edge where the first track may be stored.

Another prior art technique for reducing or minimizing lateral tape motion is to provide a first fixed plurality of tabs having a surface for contact with a first longitudinal tape edge and a second corresponding plurality of tabs having a surface for contact with the second longitudinal tape edge where the second plurality of tabs is flexible in the direction perpendicular to the tape travel path. With such an arrangement, the second plurality of tabs causes the first longitudinal tape edge to remain in contact with the first plurality of tabs while compensating for variations in tape width.

One concern with such an arrangement is tape edge damage due to wear. Because both tape edges remain in substantially constant contact with the surfaces of both pluralities of tabs, as the tape advances, the tape edges pass across the fixed surfaces (i.e., the surfaces do not move in the tape travel direction) and damage due to friction with these surfaces may result.

SUMMARY OF THE INVENTION

In accordance with the present invention, an apparatus includes two spaced apart reference mechanisms and an adjustment mechanism located in between the two reference mechanisms. Each of the reference mechanisms has a surface for engagement with a first longitudinal tape edge where both surfaces are plannarly aligned with a predetermined tape travel path and mounted for movement with the first tape edge to guide the first tape edge along the tape travel path. The adjust mechanism has a surface for engagement with the second longitudinal tape edge. The adjustment surface is parallel to the reference surfaces and mounted for movement with the second tape edge. Additionally, the adjustment surface is mounted in such a way and in a position effective to urge the first tape edge into contact with the reference surfaces to minimize movement of the tape in a direction perpendicular to the reference surfaces and the adjustment surface during tape advancement. With such an arrangement, an increased number of data tracks may be stored on a magnetic tape media by virtually eliminating lateral tape motion.

The present invention thus provides minimized lateral movement for extremely high data and track densities and allows tapes to run at their best and to be drive-interchangeable, with very little tape degradation caused by the drive. This is very important because tapes are frequently recorded in one drive and played back in a different drive. Furthermore, the use of very thin and fragile tape such as one half millinch (i.e., 0.5 mil) recording tape is enabled through the very gentle movable surfaces provided by the present invention.

BRIEF DESCRIPTION OF THE DRAWINGS

These and other features and advantages of the present invention will be more fully understood by reference to the following detailed description in conjunction with the attached drawing in which like reference numerals refer to like elements and in which.

DETAILED DESCRIPTION OF THE PREFERRED EMBODIMENT

Figure 2:
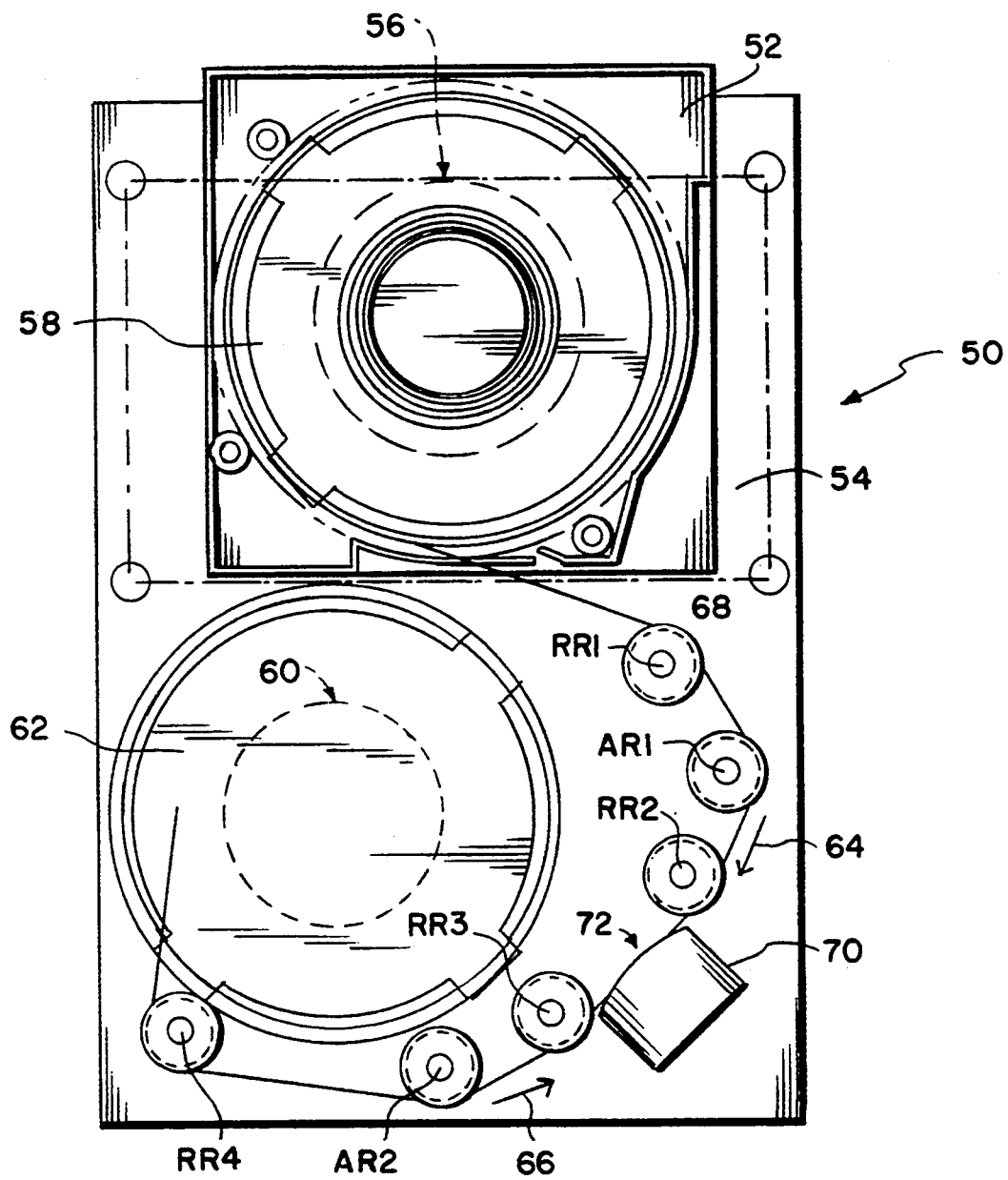
FIG. 2 is a plan view of a tape guide assembly according to the principles of the invention.

Referring now to FIG. 2, a tape drive assembly 50 is shown. Cartridge 52 is inserted into a receiver 54 of assembly 50. A motor 56 (shown in dotted outline) drives the cartridge supply reel 58. Motor 60 (shown in dotted outline) drives take-up reel 62. Proper balance of the opposing torques of the two motors produces the required tape tension and also produces tape motion either in or out of cartridge 52. Hence, the tape may be driven in either forward direction 64 or reverse direction 66 to variously write data on or read data from the tape in cooperation with the drive from motors 56, 60, as controlled by a motor controller circuit (not shown) under the direction of a processor (not shown). The tape is rewound back onto supply reel 58 before tape 68 in tape cartridge 52 is removed from tape drive assembly 50.

Figure 3:
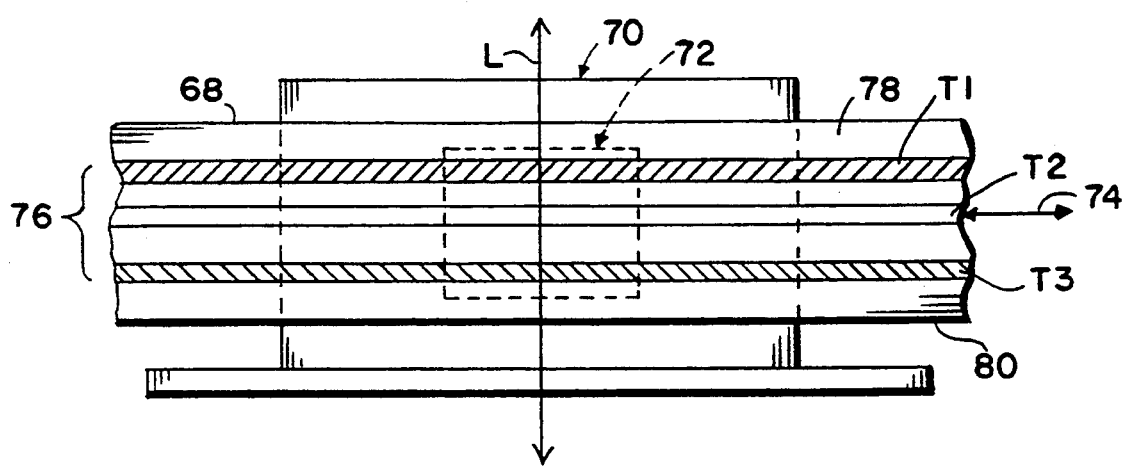
FIG. 3 is a side view of a recording tape travelling over the transducing portion of a tape head.

Head 70 is shown in FIG. 3 with tape 68 streaming across the head transducing face 72. The longitudinal tape travel path 74 is perpendicular to the lateral axis L of the head. Data is written in a plurality of parallel tracks (i.e., T1, T2, T3) on a data portion 76 of the tape. Data portion 76 lies between the tape's non-data portions 78, 80. The head 70 moves laterally up and down along axis L in order to read data on selected ones of these tracks T1, T2, T3. Therefore, the tape must always be presented across head face 72 with minimal lateral variation, preferably less than approximately ten percent of the track width, to avoid misalignment of the head and the tracks which would result in data errors.

The present invention is directed toward increasing the amount of data which may be stored in a typical (i.e., five and one quarter inch) tape drive by increasing the number of tracks which may be stored on a tape. First, minimizing the amount of lateral movement relative to the tape head experienced by the tape allows the tracks to be narrower and spaced closer together, and thus, the number of tracks stored on the tape is increased. Second, the present invention takes into consideration the difficulties of minimizing lateral tape motion when using very thin tape (i.e., one half millinch). For example, a straight length of one half millinch thick tape is flimsy and difficult to maintain in a narrow, unwavering tape flow path without damage to the tape. Further, tapes are not manufactured with perfectly straight edges. Thus, in addition to minimizing lateral tape motion, the present invention is directed toward minimizing tape edge damage. The combination of minimized lateral tape motion and minimized tape edge damage results in the non-data portions 78, 80 being significantly smaller than the non-data portions required by prior art tape drive assemblies. Reducing the size of the non-data portions again allows more tracks to be stored on the tape and hence, more data.

The location of the rollers and the basic dimensions of the rollers of the invention are similar to the rollers described in U.S. Pat. No. 5,173,828, the contents of which are hereby incorporated by reference. The roller guide assembly of this preferred embodiment is an improvement over the roller guide assembly described in the above referenced patent.

It is to be understood that although this preferred embodiment of the invention will be described with reference to a system of rollers having flanges which are fixed to the rollers, this is only by way of example. As will be described below, there are several alternative preferred embodiments.

Figure 1:
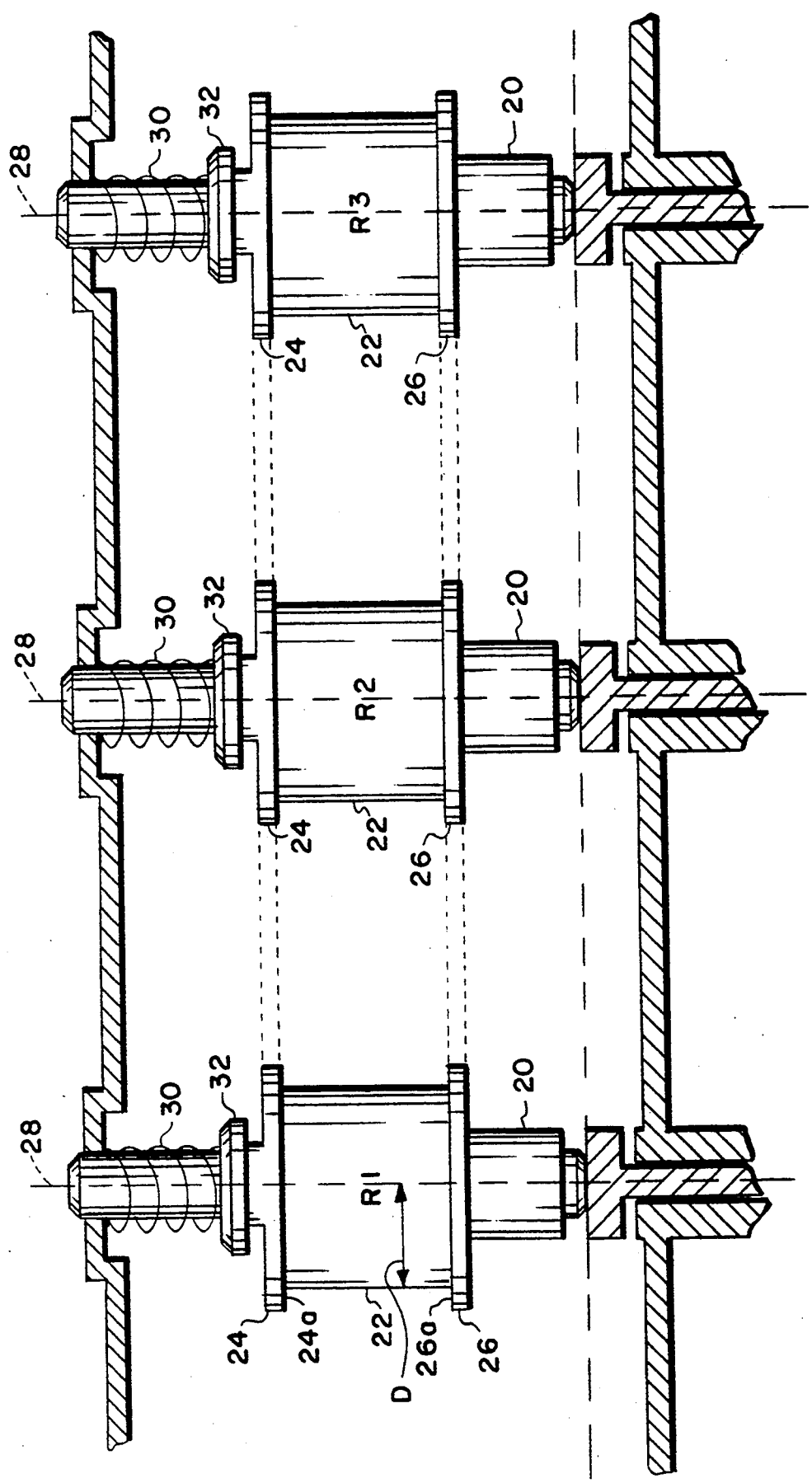
FIG. 1 is a side cross-sectional view of a prior art roller guide assembly.
Figure 4:
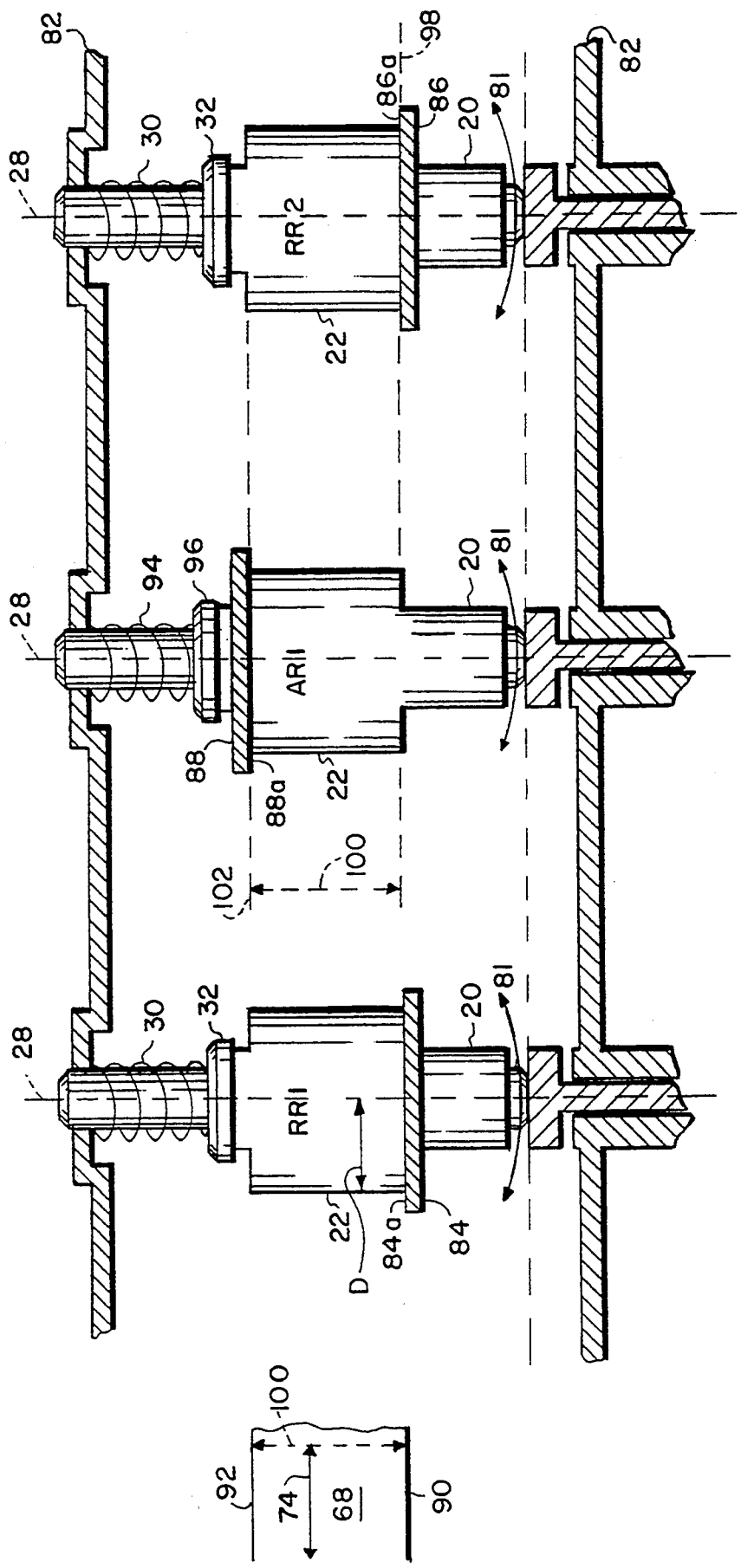
FIG. 4 is a side cross-sectional view of a roller guide assembly according to the present invention.

Referring now to FIG. 4, a cross-sectional view of a roller guide assembly according to the invention is shown. There are two reference rollers RR1, RR2 and one adjustment roller AR1 mounted for rotation with the tape 68 as the tape advances in the direction 81 of tape travel on a support structure 82 of the tape drive assembly 50 (shown in FIG. 2). Reference numbers which are identical to reference numbers shown in FIG. 1 refer to identical elements. Essentially, each tape guide roller is a machined cylinder. Each roller includes a stem 20 and a tape support surface 22. The tape support surface 22 is uniformly flat, extending parallel to the roller shaft axis 28, and preferably lies on the circumference of a six tenths millinch diameter D.

Each roller requires only one flange. Roller RR1 includes a flange 84, roller RR2 includes a flange 86 which is plannarly aligned with flange 84, and roller AR1 includes a flange 88 the plane of which is parallel to the plane of the two reference flanges 84, 86. Each reference flange 84, 86 has a surface 84a, 86a for contact with a first longitudinal tape edge 90, and the adjustment flange 88 has a surface 88a for contact with the second longitudinal tape edge 92.

Although the invention requires that each roller have only one flange to guide the longitudinal tape edges 90, 92, the roller may have a second flange on an opposite side of the tape to the first flange for purposes other than to guide a longitudinal tape edge. For instance, a second flange may be useful if the tape drive assembly looses power to prevent the tape from drooping between rollers. Moreover, many available rollers come with two flanges and it may be less expensive to use these rollers than to construct a roller with only one flange.

The reference rollers RR1, RR2 also include small coil springs 30 and washers 32 and are mounted on a preloaded ball bearing (not shown). The combination of the small coil spring 30, the washer 32, and the preloaded ball bearing (not shown) prevents reference roller movement lateral to the direction 74 of tape travel.

The adjustment roller AR1 includes a biasing coil spring 94 and a light weight washer 96. The biasing coil 94 and washer 96 permit movement of the adjustment roller AR1 and, hence, adjustment flange 88 in a direction parallel to the roller shaft axis 28 (i.e., a direction which is perpendicular to the plane 98 of the reference flange surfaces 84a, 86a.)

when there is no tape advancing along the tape travel path (i.e., the tape drive assembly is not in use), the biasing coil 94 and washer 96 provide that the adjustment roller AR1 and adjustment flange 88 are in a rest position with respect to the plane 98 of the reference flange surfaces 84a, 86a. The rest position of the adjustment flange 88 is such that the distance 100 between the plane 98 of the reference surfaces 84a, 86a and the plane 102 of the adjustment surface 88a is equal to the minimum width of the tape 68.

As the tape 68 advances along the tape travel path, the flexible mounting of the adjustment roller AR1 and, hence, the adjustment flange 88 in the direction 100 allows the adjustment flange surface 88a to contact the second longitudinal tape edge 92 to urge the tape in the direction 100. This results in the first longitudinal tape edge 90 remaining in contact with the reference flange surfaces 84a, 86a which minimizes or eliminates lateral tape motion.

The flexible mounting of the adjustment roller AR1 compensates for any variation in the tape width. For example, if the tape width is wider than the minimum tape width the second longitudinal tape edge 92 will exert pressure on the adjustment flange surface 88a which will cause the biasing coil 94 to be compressed. As the biasing coil is compressed, it pulls the washer 96, adjustment roller AR1, and adjustment flange 88 in a direction away from the plane 98 of the reference flange surfaces 84a, 86a such that the distance between the plane 102 of the adjustment surface 88a and the reference surfaces 84a, 86a is equal to the wider tape width.

The biasing coil 94 is constructed to require very little force to be compressed. Further, the washer 96 and adjustment roller AR1 are constructed such that they are very light in weight. Thus, very little force is required to move the combination of the biasing coil 94, washer 96 and adjustment roller AR1 such that even the longitudinal edge of thin magnetic tape (i.e., one half millinch thick) is strong enough to exert a sufficient force on the adjustment surface 88a to cause the combination to move away from the plane 98 of the reference surfaces 84a, 86a in order to accommodate for the changing width of the tape. Additionally, the change in width is generally a gradual change requiring a gradual increase in force to continue to compress biasing coil 94.

When a tape edge 90, 92 comes in contact with a flange surface 84a, 86a, or 88a, there is very little friction between the tape edge and the flange surface, because the flanges are fixed to the rollers so that the flanges 84, 86, 88 and flange surfaces 84a, 86a, 88a rotate with the tape as it advances. Thus, lateral motion of the tape is minimized or eliminated while also minimizing the possibility of damage due to tape wear.

Referring back to FIG. 2, a tape drive assembly having two tape guide roller assemblies according to the invention are shown. The first tape guide roller assembly comprises the two reference rollers RR1 and RR2 and the adjustment roller AR1 described above. The second tape guide roller assembly also comprises two reference rollers RR3 and RR4 and an adjustment roller AR2. The second tape guide roller assembly functions in a similar manner as that of the first tape guide roller assembly.

While one half millinch thick tape is flimsy relative to lateral motion when held in a straight beam, it becomes relatively rigid to lateral motion (perpendicular to the tape longitudinal axis 74, as shown in FIG. 3) when the tape is formed with an arc in the longitudinal axis. Thus, the location of each of rollers RR1, RR2, and AR1 is along an arcuate or curvilinear guide path to force the tape into an arcuate or curvilinear (and thus laterally rigidized) longitudinal configuration. The lateral rigidizing of the tape enables the rollers to further constrain lateral movement of the tape. Also, an additional benefit derives from this arcuate arrangement, mainly, that it enables placement of the rollers in a tight configuration such as permits its incorporation in a five and one quarter inch tape drive assembly meeting the above stated dimensional limitations.

The distance between the rollers is also a significant factor in controlling lateral tape motion. To the extent that the tape can be thought of as a fairly rigid beam, a pair of adjacent rollers controls the position and angle of the beam, but if the distance in between the pair is too small, angular accuracy is lost. However, if the pair of adjacent rollers is too widely separated, the beam-like stiffness is lost, and the tape can deviate from straightness. Thus, two rollers that are too close together (nearly adjacent) do not have much improvement over a single roller, but if the rollers are more than about four tape widths apart, then the tape is allowed too much free play, and tracking suffers. The preferred spacing of the rollers in the present invention averages one and fifty-eighths inches (i.e., approximately three tape widths), and varies only because of space constraints.

The rollers and flanges are preferably formed with the following dimensions, spacings and tolerances: the roller body is six tenths inches in diameter, the flange separation is nominally 8 millinches larger than the mean tape width, and the separation tolerance is plus or minus two and one half millinches.

It has been observed that relatively thin and slick tape (i.e., one half millinch thick tape) does not stack uniformly as it spools onto a supply or take-up reel. Therefore, such tape may unspool obliquely to the roller longitudinal axis. In practice of the present invention, the tape is desired to travel along tape path 74 (shown in FIG. 3) perpendicular to the head lateral axis L at the head, even if the tape unspooling from the supply reel or take-up reel intersects the longitudinal axis of outside roller RR1 or RR4 (shown in FIG. 2) at an oblique angle. Hence, when the tape unspools from reel 62 (or 58, shown in FIG. 3) at an oblique angle to the roller longitudinal axis 28 (shown in FIG. 1) at roller RR1 (or RR4), the tape is laterally constrained by the flanges 84, 86 of the reference rollers RR1 and RR2 (or RR3 and RR4) and flange 88 of the adjustment roller AR1 (or AR2) thus preventing lateral movement of the tape. To some degree, the amount of constraint imparted by each of the rollers RR1, RR2, AR1 or RR3, RR4, AR2 is additive because the tape is held in an arcuate path, thus making use of the local rigidization characteristic that local longitudinal bending of the tape supplies.

Figure 5:
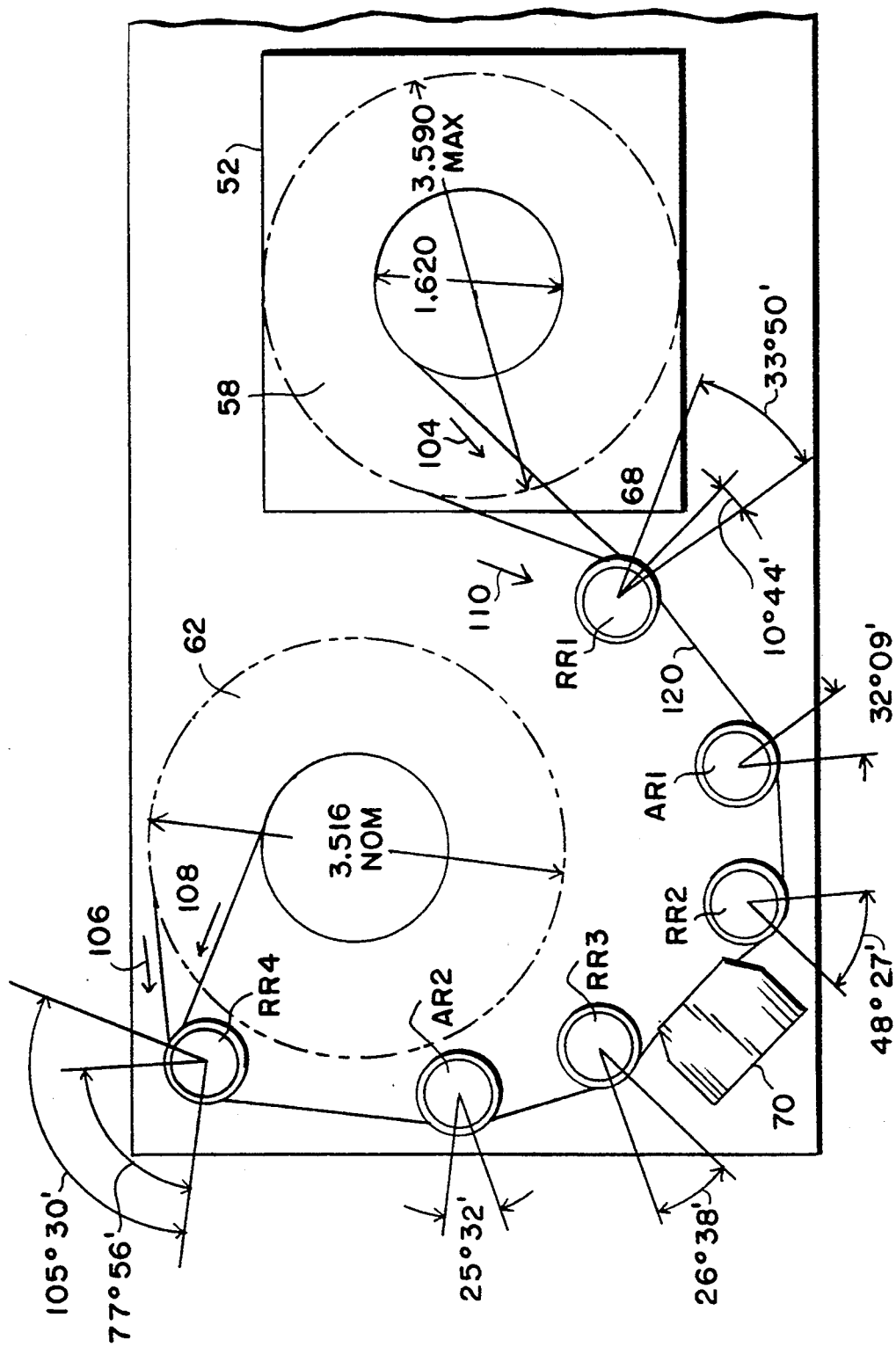
FIG. 5 is a plan view of a tape guide assembly according to the principles of the invention.

The angular contact of tape 68 with respect to rollers RR1–RR4 and AR1 and AR2 in an illustrative embodiment is shown in FIG. 5. When the tape is fully unwound from supply reel 98, the tape 68 follows path 104 and attacks roller RR1 at an angle of approximately eleven degrees and, at the same time, the tape in path 106 attacks roller RR4 over about seventy-eight degrees of its surface as it loads onto the loaded take-up reel 62. Similarly, tape path 108 on the unloaded take-up reel 62 captures approximately one hundred and five degrees of roller RR4 with a corresponding tape path 110 of the loaded supply reel 58 attacking approximately thirty-four degrees of the surface of roller RR1. The angular contact for each roller AR1, RR2, RR3, AR2 is approximately thirty-two, forty-eight, twenty-seven and twenty-six degrees, respectively. Roller RR4 also serves as a tachometer roller. To assure the optimal performance of roller RR4, a substantial amount of the surface of roller RR4 is forced into the tape travel path, as shown.

The multiple roller magnetic tape guide system described herein has demonstrated high storage capabilities per cartridge by allowing the use of narrow tracks spaced closely together and spaced close to the longitudinal tape edges which allows for more tracks to be stored across the tape width. Storage capacity of this magnitude is not presently available. The interaction of the three rollers and their respective flanges essentially eliminates lateral tape motion, while each flange exerts only a small lateral force on the tape so as not to damage or wear the tape edges.

Additionally, interchangeability of tapes from drive to drive incorporating the invention is provided which allows for system flexibility. A user may record data on any tape drive assembly and read it back on any other tape drive assembly in a family, including transporting tapes between locations. If good tracking (i.e., minimized lateral motion) were not available, high reliability readback would require readback on the same drive used to record the tape.

As previously mentioned, the roller guide assembly described above is an example of one preferred embodiment of the invention. An alternative embodiment would be where the adjustment flange 88 (shown in FIG. 4) is not fixed to the adjustment roller AR1 and is free to move in the direction 100 such that the biasing coil 94 need only pull the washer 96 and flange 88 during compression due to an increase in tape width. This embodiment may require even less force from the second longitudinal tape edge to move the flange surface 88a.

Another embodiment of the invention would not use rollers, but rather two plannarly aligned reference surfaces for contact with a first longitudinal tape edge and an adjustment surface located in between the two reference surfaces and in a plane parallel to the plane of the two reference surfaces for contact with the second longitudinal tape edge. All three surfaces are mounted to allow for movement of the surfaces with the tape as the tape advances in the direction of the tape travel path. The adjustment surface is also movable in the direction perpendicular to the plane of the reference surfaces such that the adjustment surface contacts the second longitudinal tape edge to urge the tape in the direction of the plane of the reference surfaces in order to cause the first longitudinal tape edge to remain in contact with the reference surfaces.

Another alternative embodiment of the invention would include the reference surfaces and adjustment surface of the above described embodiment, however, the plane of the adjustment surface would be a fixed distance away from the plane of the reference surfaces. The fixed distance would be slightly less than the minimum tape width such that the second longitudinal tape edge would bend slightly to provide the means (i.e., springing action) to urge the tape in the direction of the plane of the reference surfaces and, thus, cause the first longitudinal tape edge to remain in contact with the reference surfaces.

It will now be understood that the present invention provides a multiplicity of surfaces which contact the longitudinal edges of the tape, which move in the direction of the tape travel path, and of which some move in a direction perpendicular to the direction of the tape travel path to urge the tape into a prescribed tape travel path and virtually eliminate lateral tape motion. Although the surfaces do not exert much force on the edges of the tape, they and their positioning are nevertheless the essential means of guiding the tape.

It will be understood that the above description pertains to only several embodiments of the present invention. That is, the description is provided by way of illustration and not by way of limitation. The invention, therefore, is to be defined according to the following claims.

What is claimed is:

1. A tape guide assembly, comprising:
two spaced apart reference mechanisms, each of the reference mechanisms having a reference surface for engagement with a first longitudinal tape edge, the reference surfaces being planarly aligned with a predetermined tape travel path and mounted for movement with the first tape edge to guide the first tape edge along the tape travel path; and
an adjustment mechanism located in between the two reference mechanisms, the adjustment mechanism having an adjustment surface for engagement with the second longitudinal tape edge, the adjustment surface being parallel to the reference surfaces, being mounted for movement with the second tape edge to guide the second tape edge along the tape travel path, and being flexibly mounted for movement with the second tape edge in a direction perpendicular to the plane of the reference surfaces to urge the first tape edge into contact with the reference surfaces to minimize movement of the tape in a direction perpendicular to the reference surfaces and the adjustment surface during the tape movement.

2. The tape guide assembly according to claim 1, wherein the adjustment surface is mounted in such a way that the distance between the plane of the adjustment surface and the plane of the reference surfaces is a fixed distance, the fixed distance being slightly less than the tape width such that a portion of the tape parallel to the second tape edge provides a springing mechanism to urge the first tape edge into contact with the reference surfaces.

3. The tape guide assembly according to claim 1, further comprising:
a biasing mechanism coupled to the adjustment surface to bias the movement of the adjustment surface in a direction toward the plane of the reference surfaces.

4. The tape guide assembly according to claim 3, wherein the biasing mechanism is a spring.

5. The tape guide assembly according to claim 1, wherein the adjustment surface is fixed to the adjustment mechanism such that the entire adjustment mechanism is mounted for movement in a direction perpendicular to the plane of the reference surfaces.

6. The tape guide assembly according to claim 5, further comprising:
a biasing mechanism coupled to the adjustment mechanism to bias the movement of the adjustment mechanism in a direction toward the plane of the reference surfaces.

7. The tape guide assembly according to claim 6, wherein the biasing mechanism is a spring.

8. The tape guide assembly according to claim 1, wherein the reference surfaces are rotatably mounted and the adjustment surface is rotatably mounted.

9. A tape guide assembly, comprising:
two spaced apart rotatably mounted reference rollers, each of the rollers having a reference flange for engagement with a first longitudinal tape edge, the reference flanges being planarly aligned with a predetermined tape travel path and mounted for movement with the first tape edge to guide the first tape edge along the tape travel path; and
a rotatably mounted adjustment roller located in between the two reference rollers, the adjustment roller having an adjustment flange for engagement with the second longitudinal tape edge, the adjustment flange being parallel to the reference flanges, being mounted for movement with the second tape edge to guide the second tape edge along the tape travel path, and being flexibly mounted for movement with the second tape edge in a direction perpendicular to the plane of the reference flanges to urge the first tape edge into contact with the reference flanges to minimize movement of the tape in a direction perpendicular to the reference flanges and the adjustment flange during the tape advancement.

10. The tape guide assembly according to claim 9, wherein the adjustment flange is mounted in such a way that the distance between the plane of the adjustment flange and the plane of the reference flange is a fixed distance, the fixed distance being slightly less than the tape width such that a portion of the tape parallel to the second tape edge provides a springing mechanism to urge the first tape edge into contact with the reference flanges.

11. The tape guide assembly according to claim 10, wherein the adjustment flange is fixed to the adjustment roller such that the entire adjustment roller is mounted for movement in a direction perpendicular to the plane of the reference flanges.

12. The tape guide assembly according to claim 11, further comprising:
a biasing mechanism coupled to the adjustment roller to bias the movement of the adjustment roller in a direction toward the plane of the reference flanges.

13. The tape guide assembly according to claim 12, wherein the biasing mechanism is a spring.

14. The tape guide assembly according to claim 10, further comprising:
a biasing mechanism coupled to the adjustment flange to bias the movement of the adjustment in a direction toward the plane of the reference flanges.

15. The tape guide assembly according to claim 14, wherein the biasing mechanism is a spring.

16. A tape guide assembly, comprising:
a plurality of spaced apart reference mechanisms, each of the reference mechanisms having a surface for engagement with a first longitudinal tape edge, the reference surfaces being planarly aligned with a predetermined tape travel path and mounted for movement with the first tape edge to guide the first tape edge along the tape travel path; and
a plurality of spaced apart adjustment mechanisms, each of the adjustment mechanisms having a surface for engagement with the second longitudinal tape edge, the adjustment surface being planarly aligned with the tape travel path and parallel to the reference surfaces, being mounted for movement with the second tape edge to guide the second tape edge along the tape travel path, and being flexibly mounted for movement with the second tape edge in a direction perpendicular to the plane of the reference surfaces to urge the first tape edge into contact with the reference surfaces to minimize movement of the tape in a direction perpendicular to the reference surfaces and the adjustment surfaces during tape advancement.

17. The tape guide assembly according to claim 16, wherein for each reference surface there is a corresponding adjustment surface located in a position similar to the corresponding reference surface and transverse to the tape width.

18. A tape guide assembly for presentation of a magnetic tape along a predetermined tape travel path from a first side of a magnetic head to a second side of the head in contact with an intermediate transducing face of the head and transverse to a lateral axis of the head, such that lateral movement of the tape spooling between a respective supply reel and a take-up reel is minimized, the assembly comprising:
a first rotatably mounted reference roller located adjacent to a first side of the head and having a first reference flange for engagement with a first longitudinal tape edge, the first reference flange being planarly aligned with the tape travel path and mounted for movement with the first tape edge to guide the first tape edge along the tape travel path;
a second rotatably mounted reference roller located adjacent to the supply reel and having a second reference flange for engagement with the first tape edge, the second reference flange being planarly aligned with the first reference flange and the tape travel path and mounted for movement with the first tape edge to guide the first tape edge along the tape travel path;

a first rotatably mounted adjustment roller located in between the first and second reference rollers and having a first adjustment flange for engagement with the second longitudinal tape edge, the first adjustment flange being in a plane parallel to the plane of the first and second reference flanges, being mounted for movement with the second tape edge, and being in a position effective to urge the first tape edge into contact with the first and second reference flanges to minimize lateral movement of the tape during tape advancement through a portion of the tape travel path between the supply reel and the head;

a third rotatably mounted reference roller located adjacent to a second side of the head and having a third reference flange for engagement with the first tape edge, the third reference flange being planarly aligned with the first and second reference flanges and the tape travel path and mounted for movement with the first tape edge to guide the first tape edge along the tape travel path;

a fourth rotatably mounted reference roller adjacent to the tape-up reel, and having a fourth reference flange for engagement with the first tape edge, the fourth reference flange being planarly aligned with the first, second, and third reference flanges and the tape travel path and mounted for movement with the first tape edge to guide the first tape edge along the tape travel path;

a second rotatably mounted adjustment roller located in between the third and fourth reference rollers and having a second adjustment flange for engagement with the second tape edge, the second adjustment flange being planarly aligned with the first adjustment flange and the tape travel path and in a plane parallel to the plane of the reference flanges, being mounted for movement with the second tape edge, and being in a position effective to urge the first tape edge into contact with the third and fourth reference flanges to minimize lateral movement of the tape during tape advancement through a portion of the tape travel path between the head and the take-up reel; and wherein the first and second adjustment rollers in combination with the first, second, third, and fourth reference rollers are mounted on a support structure in such a way that the tape travel has and arcuate shape which runs essentially perpendicular to the head lateral axis.

19. A method of presenting a recording tape to a magnetic head with the tape constrained from excess lateral movement perpendicular to tracks recorded on the tape as the tape streams across the front of the head, for rendering the tape interchangeable between various tape drives of interest for repeatedly accurate tracking at high data and track densities, the method comprising the step of:

providing in each tape drive of interest an arcuate tape travel path across a set of at least three spaced apart rotatably mounted rollers on one side of the head where a first and a third rotatably mounted roller is a reference roller, each reference roller having a reference flange for engagement with a first longitudinal tape edge, the reference flanges being planarly aligned with a predetermined tape travel path and mounted for movement with the first tape edge to guide the first tape edge along the tape travel path, and where a second rotatably mounted roller is an adjustment roller located in between the first and third reference rollers, the adjustment roller having an adjustment flange for engagement with the second longitudinal tape edge, the adjustment flange being in a plane parallel to the plane of the reference flanges, being mounted for movement with the second tape edge to guide the second tape edge along the tape travel path, and being flexibly mounted for movement with the second tape edge in a direction perpendicular to the plane of the reference flanges to urge the first tape edge into contact with the reference flanges to minimize lateral movement of the tape perpendicular to tracks recorded on the tape during tape advancement.

* * * * *